US009483884B2

(12) United States Patent
Chen et al.

(10) Patent No.: US 9,483,884 B2
(45) Date of Patent: *Nov. 1, 2016

(54) SMART PHONE APP-BASED REMOTE VEHICLE DIAGNOSTIC SYSTEM AND METHOD

(71) Applicant: Innova Electronics, Inc., Irvine, CA (US)

(72) Inventors: Ieon C. Chen, Laguna Hills, CA (US); Keith Andreasen, Garden Grove, CA (US)

(73) Assignee: Innova Electronics, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,949

(22) Filed: Mar. 12, 2015

(65) Prior Publication Data

US 2015/0187146 A1 Jul. 2, 2015

Related U.S. Application Data

(63) Continuation-in-part of application No. 14/509,874, filed on Oct. 8, 2014, and a continuation-in-part of application No. 13/467,884, filed on May 9, 2012, now Pat. No. 9,002,554.

(51) Int. Cl.
*G01M 17/00* (2006.01)
*G06F 7/00* (2006.01)
(Continued)

(52) U.S. Cl.
CPC ................ *G07C 5/008* (2013.01); *G07C 5/02* (2013.01); *G07C 5/08* (2013.01); *G07C 5/085* (2013.01); *G07C 5/0825* (2013.01)

(58) Field of Classification Search
CPC .......... G07C 5/008; G07C 5/02; G07C 5/08; G07C 5/0825; G07C 5/085; G07C 2205/02
USPC ............ 701/31.5, 29.4, 31.4, 29.9; 340/901, 340/905; 342/357.22, 357.52
See application file for complete search history.

(56) References Cited

U.S. PATENT DOCUMENTS

D334,560 S 4/1993 Wilson
5,347,211 A 9/1994 Jakubowski
(Continued)

FOREIGN PATENT DOCUMENTS

WO WO 0186576 11/2001

*Primary Examiner* — Jerrah Edwards
*Assistant Examiner* — Rachid Bendidi
(74) *Attorney, Agent, or Firm* — Stetina Brunda Garred & Brucker

(57) ABSTRACT

Provided is a remote vehicle diagnostic system which utilizes a smart phone as a centralized communication hub between a vehicle and several remote resources. The system includes a program downloadable onto the smart phone to program the phone to perform desired functionality. The smart phone app may allow the smart phone to operate in several different modes, including a diagnostic mode and an emergency mode. In the diagnostic mode, the smart phone may relay vehicle data from the vehicle to a remote diagnostic center. The smart phone may also query the user to obtain symptomatic diagnostic information, which may also be uploaded to the remote diagnostic center. In the emergency mode, the smart phone may be configured to upload critical information to a remote diagnostic center, as well as an emergency response center. The emergency mode may be triggered automatically in response to the vehicle being in an accident, or alternatively, but user actuation.

23 Claims, 5 Drawing Sheets

(51) Int. Cl.

| | |
|---|---|
| ***G06F 19/00*** | (2011.01) |
| ***G07C 5/00*** | (2006.01) |
| ***G07C 5/02*** | (2006.01) |
| ***G07C 5/08*** | (2006.01) |

(56) References Cited

U.S. PATENT DOCUMENTS

D377,622 S 1/1997 Chen
5,635,841 A 6/1997 Taylor
5,758,300 A 5/1998 Abe
5,767,681 A 6/1998 Huang
5,809,437 A 9/1998 Breed
5,859,628 A 1/1999 Ross et al.
5,884,202 A 3/1999 Arjomand
6,000,413 A 12/1999 Chen
6,055,468 A 4/2000 Kaman et al.
6,094,609 A 7/2000 Arjomand
6,169,943 B1 1/2001 Simon et al.
6,225,898 B1 5/2001 Kamiya et al.
6,263,268 B1 7/2001 Nathanson
6,389,337 B1 5/2002 Kolls
6,438,471 B1 8/2002 Katagishi et al.
6,499,385 B2 12/2002 Protti
6,535,112 B1 3/2003 Rothshink
6,587,768 B2 7/2003 Chene et al.
6,611,740 B2 8/2003 Lowrey et al.
6,650,318 B1 11/2003 Arnon
6,718,425 B1 4/2004 Pajakowski et al.
6,732,031 B1 5/2004 Lightner et al.
6,807,469 B2 10/2004 Funkhouser et al.
6,836,708 B2 12/2004 Tripathi
6,847,916 B1 1/2005 Ying
6,868,369 B2 3/2005 Huang
6,925,368 B2 8/2005 Funkhouser et al.
6,940,270 B2 9/2005 Chen
D510,287 S 10/2005 Chen
6,957,133 B1 10/2005 Hunt et al.
6,968,733 B2 11/2005 Andreasen
7,030,742 B2 4/2006 Treadway
7,085,680 B2 8/2006 Huang
7,116,216 B2 10/2006 Andreasen
7,209,813 B2 4/2007 Namaky
RE39,619 E 5/2007 Andreasen
D545,223 S 6/2007 Chen
D558,621 S 1/2008 Rich
D559,137 S 1/2008 Protti
D560,129 S 1/2008 Rich
D560,527 S 1/2008 Rich
7,325,775 B2 2/2008 Chen
D563,249 S 3/2008 Chen
7,363,149 B2 4/2008 Klausner et al.
D569,280 S 5/2008 Chen
7,376,497 B2 5/2008 Chen
D571,241 S 6/2008 Andreasen
7,437,227 B2 10/2008 Andreasen
D581,822 S 12/2008 Madison
7,464,000 B2 12/2008 Huang
D590,387 S 4/2009 Chen
7,520,668 B2 4/2009 Chen
RE40,798 E 6/2009 Chen
RE40,799 E 6/2009 Chen
7,603,293 B2 10/2009 Chen
7,620,484 B1 11/2009 Chen
D610,586 S 2/2010 Chen
7,734,390 B2 6/2010 Chen
7,778,750 B2 8/2010 Knight et al.
D624,446 S 9/2010 Chen
D624,838 S 10/2010 Chen
D625,209 S 10/2010 Chen
D625,210 S 10/2010 Chen
D625,634 S 10/2010 Chen
7,904,219 B1 3/2011 Lowrey et al.
7,974,750 B2 7/2011 Namaky
8,019,503 B2 9/2011 Andreasen
8,024,083 B2 * 9/2011 Chenn .................... G07C 5/008 701/2
D646,188 S 10/2011 Chen
D646,599 S 10/2011 Chen
8,032,419 B2 10/2011 Chen
8,068,951 B2 11/2011 Chen et al.
8,301,329 B2 10/2012 Andreasen
8,306,687 B2 11/2012 Chen
8,370,018 B2 2/2013 Andreasen
8,457,323 B2 6/2013 Palmestal
8,509,986 B1 8/2013 Chen
8,570,168 B2 10/2013 Logan et al.
8,620,518 B2 12/2013 Bradley et al.
8,630,765 B2 1/2014 Chen
8,825,271 B2 9/2014 Chen
8,831,814 B2 9/2014 Chen
8,855,621 B2 10/2014 Chen
8,862,117 B2 10/2014 Chen
8,880,274 B2 11/2014 Chen
8,909,416 B2 12/2014 Chen et al.
9,002,554 B2 4/2015 Chen
9,014,908 B2 4/2015 Chen
9,026,400 B2 5/2015 Chen et al.
9,242,619 B2 * 1/2016 Choi ....................... B60R 25/25
2003/0171111 A1 9/2003 Clark
2004/0110472 A1 6/2004 Witkowski
2005/0125117 A1 * 6/2005 Breed .................... G07C 5/008 701/31.5
2007/0156311 A1 * 7/2007 Elcock ................... G07C 5/008 701/31.4
2008/0015748 A1 * 1/2008 Nagy ..................... G07C 5/008 701/31.4
2008/0161988 A1 * 7/2008 Oesterling ............. G07C 5/008 701/31.4
2009/0276115 A1 * 11/2009 Chen ...................... G07C 5/008 701/29.6
2010/0256865 A1 * 10/2010 Ying ................... H04L 12/2697 701/31.4
2011/0224866 A1 9/2011 Chen
2011/0264322 A1 10/2011 Chen
2013/0049987 A1 * 2/2013 Velusamy ............ G08G 1/0112 340/905
2013/0261846 A1 10/2013 McQuade et al.
2013/0261874 A1 10/2013 McQuade et al.
2013/0261907 A1 10/2013 McQuade et al.
2013/0261939 A1 10/2013 McQuade et al.
2013/0261942 A1 10/2013 McQuade et al.
2013/0297175 A1 11/2013 Davidson
2013/0304347 A1 11/2013 Davidson
2013/0304348 A1 11/2013 Davidson et al.
2013/0304349 A1 11/2013 Davidson
2014/0012460 A1 * 1/2014 Kleinschmidt ........ G06Q 10/20 701/31.5
2014/0032062 A1 1/2014 Baer et al.
2014/0046800 A1 2/2014 Chen
2014/0052328 A1 2/2014 Nguyen
2014/0055276 A1 2/2014 Logan et al.
2014/0200760 A1 * 7/2014 Kaufmann ............. G07C 5/008 701/29.3

* cited by examiner

SMART PHONE APP-BASED REMOTE VEHICLE DIAGNOSTIC SYSTEM AND METHOD

CROSS-REFERENCE TO RELATED APPLICATIONS

This application is a continuation-in-part application of U.S. application Ser. No. 14/509,874, filed Oct. 8, 2014, and is a continuation-in-part application of U.S. application Ser. No. 13/467,884, filed May 9, 2012, the contents of both applications being expressly incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates to communication and monitoring systems for vehicles, and more particularly, to an all-in-one communication and monitoring system for interfacing onboard automotive diagnostic systems and remote diagnostic, repair, monitoring and emergency services.

2. Description of the Related Art

Vehicle safety is concern shared among many different groups of people. Such concern not only relates to the drivability of the vehicle, but also to the safety of the driver and any passenger located in the vehicle. For instance, parents are concerned for the safety of their driving-aged children; employers are concerned for the safety of employees driving company vehicles; and rental car companies are concerned for the safety of those renting their vehicles. In many cases, the concerned party is not located in the vehicle, and oftentimes worries that the vehicle is operational and the driver is safe.

In view of the concerns associated with driving a vehicle, various automotive monitoring systems have been implemented into vehicles to provide a resource to a driver who may be in need. An exemplary automotive monitoring system is the OnStar™ system, operated by General Motors Corporation. The system typically includes a wireless appliance installed in the vehicle, wired to the vehicle diagnostic system. The wireless appliance may include, or be wired to a global position satellite (GPS) system, for generating information respecting the location of the vehicle. OnStar™ system also allows remote operation of certain vehicle systems, e.g. unlocking the doors. The OnStar™ service is typically provided on a subscription basis, with the first year being free of charge with the purchase of qualifying vehicles, i.e. typically higher priced vehicles.

Another wireless vehicle system of note is the LoJack™ system for protecting vehicle theft conditions, and monitoring the location of the vehicle in the event that it is stolen or lost. Like the OnStar™ system, the LoJack™ system utilizes a wireless appliance that incorporates a GPS system, communicates to a dedicated receiver, and charges a subscription fee to maintain and support the data link.

While dedicated communication links such as those utilized in the OnStar™ system and the LoJack™ system, can provide useful diagnostic services and security in relation to a variety of circumstances, such systems suffer from a variety of practical and economic factors that tend to limit their use and customer base.

A common shortcoming of such contemporary systems is that they typically require dedicated hardware, e.g. a wireless appliance mounted to a vehicle and electrically connected to the vehicle computer. Such hardware is typically installed by a trained installer or by original car manufacturer. Moreover, the hardware relies upon a dedicated wireless communication link to a specific service provider. Consequently, the user may feel captive to a particular diagnostic subscription service. Such systems may be viewed as expensive, of limited functionality, and tend to be standard equipment only in higher priced vehicles. An additional deficiency commonly associated with many contemporary systems is that operation of the system is dependent upon the associated vehicle. In this respect, if the power on the vehicle should become disabled, the monitoring system may also become disabled. Thus, in the event of an accident which results in a power loss to the vehicle, the monitoring system may be unable to signal for help.

Given the rapid evolution of cellphones, and the proliferation of multiservice cellular telephone networks, the need for accessing a diagnostic system communications link may be better served by cellphones, and which allow a broader choice of contacts. In relation to conventional prior art systems, it would be desirable to provide a diagnostic communication system that does not require mounting to a vehicle chassis, or need installation by a trained installer.

It is desirable to provide a diagnostic communication system that does not require a dedicated communications link, but rather allows a user to connect to a variety of generally available contacts on the cellular network, public telephone network and the internet, without the need for participation in a subscription communication service.

It is further desirable to provide a diagnostic communication system that is installable, removable, hand transportable and connectable to different vehicles, without the need for trained assistance or service registration.

It is also desirable to provide a hand transportable diagnostic communication system that allows for internal storage of vehicle diagnostic information, and transfer of the information, wirelessly and/or manually, to a general purpose computer. Such manual data transport would allow for storage and communication of data to a remote service provider, even when communication via cellular telephone network or local connectivity circuit is unavailable.

As described below, the present invention, in different combination embodiments, addresses these and other improvements to contemporary vehicle diagnostic communication systems, and business methods related thereto.

BRIEF SUMMARY OF THE INVENTION

There is provided a remote vehicle diagnostic system which utilizes a smart phone as a centralized communication hub between a vehicle and several remote resources. The system may include a program or "app" downloadable on the smart phone to program the phone to perform the desired functionality. The smart phone app may allow the smart phone to operate in several different modes, including a diagnostic mode and an emergency mode. In the diagnostic mode, the smart phone may relay vehicle data from the vehicle to a remote diagnostic center. The smart phone may also query the user to obtain symptomatic diagnostic information, which may also be uploaded to the remote diagnostic center. In the emergency mode, the smart phone may be configured to upload critical information to a remote diagnostic center, as well as an emergency response center. The emergency mode may be triggered automatically in response to the vehicle being in an accident, or alternatively, by user actuation.

According to one embodiment, there is provided an automotive diagnostic system for use with a remote diagnostic center, a smart phone, and a vehicle having an onboard vehicle computer which generates and stores vehicle data and an accident indicator generated in response to a vehicle accident event. The vehicle data may include at least one diagnostic trouble code (DTC) generated in response to a problematic operating condition, as well as information concerning the operational status of the vehicle battery. The automotive diagnostic system includes a data storage unit connectable with the onboard vehicle computer for retrieving vehicle data from the onboard vehicle computer and storing the vehicle data. The data storage unit is configured to generate a first emergency initiation signal in response to receipt of the accident indicator. The automotive diagnostic system further includes a computer readable medium downloadable onto the smart phone for configuring the smart phone to communicate with the data storage unit, receive a second emergency initiation signal from the user, and operate in a diagnostic mode and an emergency mode. In the diagnostic mode, the smart phone uploads vehicle data to the remote diagnostic center when the vehicle data includes at least one DTC, and initiates a symptomatic question sequence for the user when the vehicle data does not include at least one DTC. In the emergency mode, the smart phone uploads vehicle data to the remote diagnostic center automatically in response to receipt of one of the first and second emergency initiation signals.

According to another embodiment, there is provided an automotive diagnostic system for use with a remote diagnostic center, a smart phone having a sensor for detecting a prescribed vehicle operational condition, and a vehicle having an onboard vehicle computer which generates and stores vehicle data including operational data and an accident indicator generated in response to a vehicle accident event. The automotive diagnostic system includes a data storage unit connectable with the onboard vehicle computer for retrieving vehicle data from the onboard vehicle computer and storing the vehicle data. The data storage unit is configured to generate a first emergency initiation signal in response to receipt of the accident indicator. The system further includes computer executable instructions downloadable onto the smart phone for configuring the smart phone to: communicate with the data storage unit; receive a second emergency initiation signal from the user; generate a third emergency initiation signal in response to detection of the prescribed vehicle operational condition; and operate in a diagnostic mode and an emergency mode. In the diagnostic mode, the smart phone uploads vehicle data to the remote diagnostic center when the vehicle data includes a predetermined operational data, and initiates a symptomatic question sequence for the user when the vehicle data does not include the predetermined operational data. In the emergency mode, the smart phone uploads vehicle data to the remote diagnostic center automatically in response to receipt of one of the first, second, and third emergency initiation signals. The computer executable instructions further configure the smart phone to assign a diagnostic mode button and an emergency mode button, such that when the diagnostic mode button is activated by the user, the smart phone enters the diagnostic mode, and when the emergency mode button is activated by the user, the second initiation signal is generated.

The operational data may include battery condition information and the data storage unit may be configured to retrieve the battery condition information from the onboard vehicle computer.

The data storage unit may include an internal power supply separate from a vehicle power supply. The data storage unit may be configured to receive a voltage signal from the vehicle when the data storage unit is connected to the vehicle, and generate a voltage loss signal when the data storage unit is connected to the vehicle and the voltage signal is below a prescribed threshold.

The computer executable instructions may configure the smart phone to detect the prescribed vehicle operational condition based on a sensed change in acceleration. The computer executable instructions may configure the smart phone to detect the prescribed vehicle operational condition based on a sensed acoustic signal. The computer executable instructions may configure the smart phone to detect the prescribed vehicle operational condition based on combination of a sensed acoustic signal and a sensed change in acceleration.

The data storage unit is adapted to transmit a wireless signal. The data storage unit may be adapted to transmit the wireless signal using a short-range wireless protocol having a range of less than or equal to 50 feet.

The present invention is best understood by reference to the following detailed description when read in conjunction with the accompanying drawings.

BRIEF DESCRIPTION OF THE DRAWINGS

These as well as other features of the present invention will become more apparent upon reference to the drawings wherein.

Common reference numerals are used throughout the drawings and detailed description to indicate like elements.

DETAILED DESCRIPTION OF THE INVENTION

Figure 1:
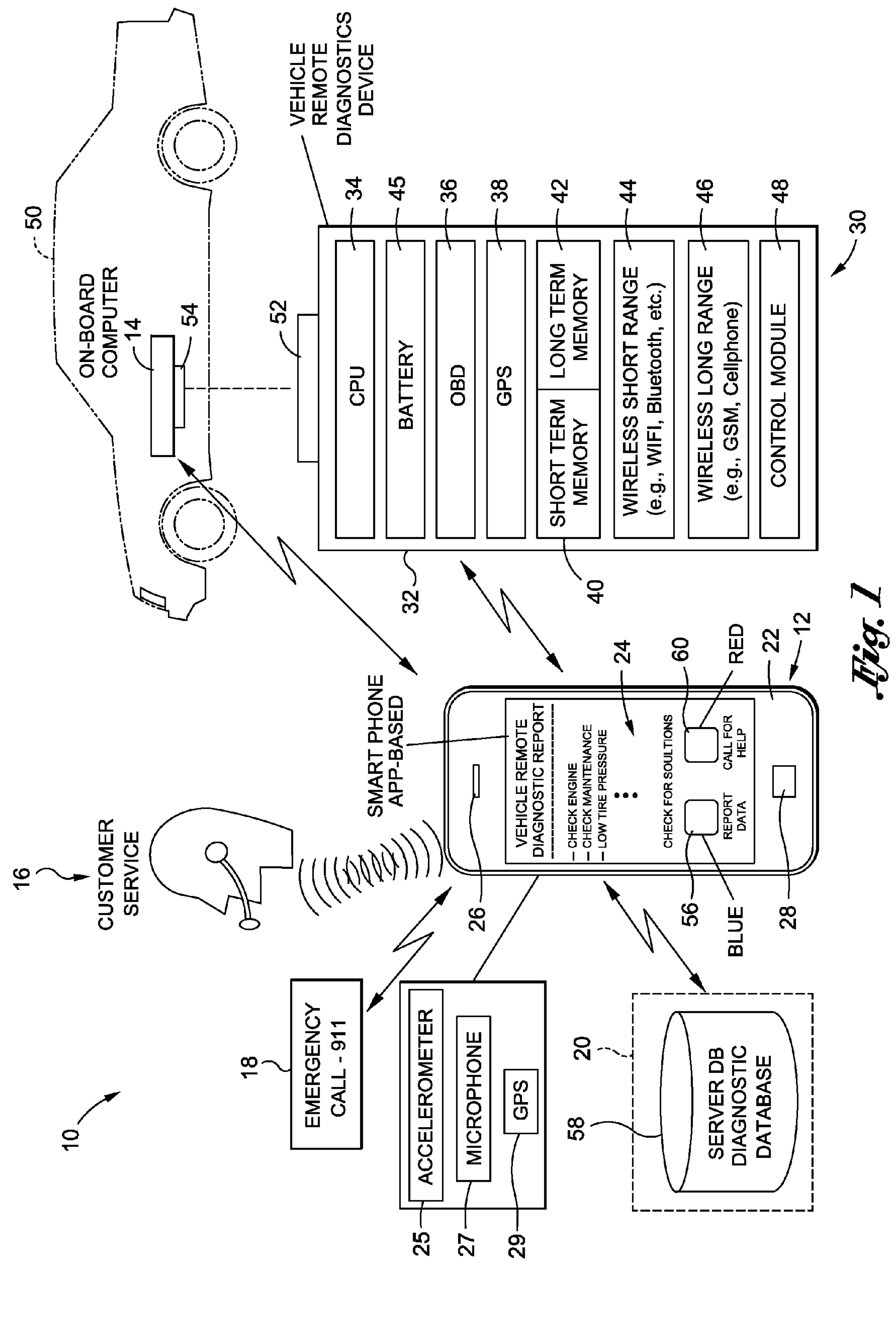
FIG. 1 is a schematic overview of an embodiment of a smart phone based vehicle remote diagnostic system.

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring now to the drawings, wherein the showings are for the purpose of illustrating a preferred embodiment of the present invention only, and are not for purpose of limiting the same, there is shown an automotive diagnostic system 10 which utilizes a smart phone 12 as a centralized diagnostic information hub to organize and communicate information between various remote diagnostic resources to provide an all-in-one system capable of automotive diagnostics, automotive monitoring, as well as providing several safety features in connection with operation of the vehicle. The system 10 is a hybrid diagnostic and vehicle monitoring system, which not only protects those located in the vehicle, but also provides vehicle information to inform the driver, or a concerned individual, such as a parent, employer, or vehicle owner, as to the operational status of the vehicle. The smart phone 12 may communicate with a vehicle's on-board computer 14, the driver of the vehicle, and remote resources, such as a customer service center 16, an emergency response center 18, or diagnostic database 20. The smart phone 12 may include software, i.e. a "smart phone app," or other computer readable medium operative to configure the smart phone 12 for interfacing with the various remote diagnostic resources, prompting various commands/requests and displaying diagnostic information for the user. The smart phone app is operative to configure the smart phone 12 to operate in one of several modes, including but not limited to a diagnostic mode and an emergency mode. The smart phone 12 may begin operation in one of the various modes according to user input, or based on information received from the on-board computer 14, or alternatively, based on information detected by the smart phone 12. The system 10 may further be adapted to obtain vehicle operational data from several different sources, including the vehicle, the driver, as well as information obtained from sensors located on the smart phone 12. In this respect, the system 10 is extremely adaptable to obtain information from as many resources as may be available at a given time. In this respect, if the vehicle itself fails or is incapable of providing information, the system 10 may be able to rely on information obtained from the smart phone 12 and/or the driver to provide a basic level of diagnostic analysis and vehicle monitoring.

It is understood that vehicles may be capable of supplying different levels of data and information. Along these lines, more recent models of vehicles tend to be more sophisticated than older vehicles, and as such, more recent vehicle models are typically capable of providing higher levels of data and information. Various embodiments of the system 10 described herein are adapted for use with vehicles which may provide significant amounts of data and information, as well as vehicles which may provide very little, if any, data and information. In this respect, the system 10, at least in part, may be capable of use with almost any vehicle.

Figure 2:
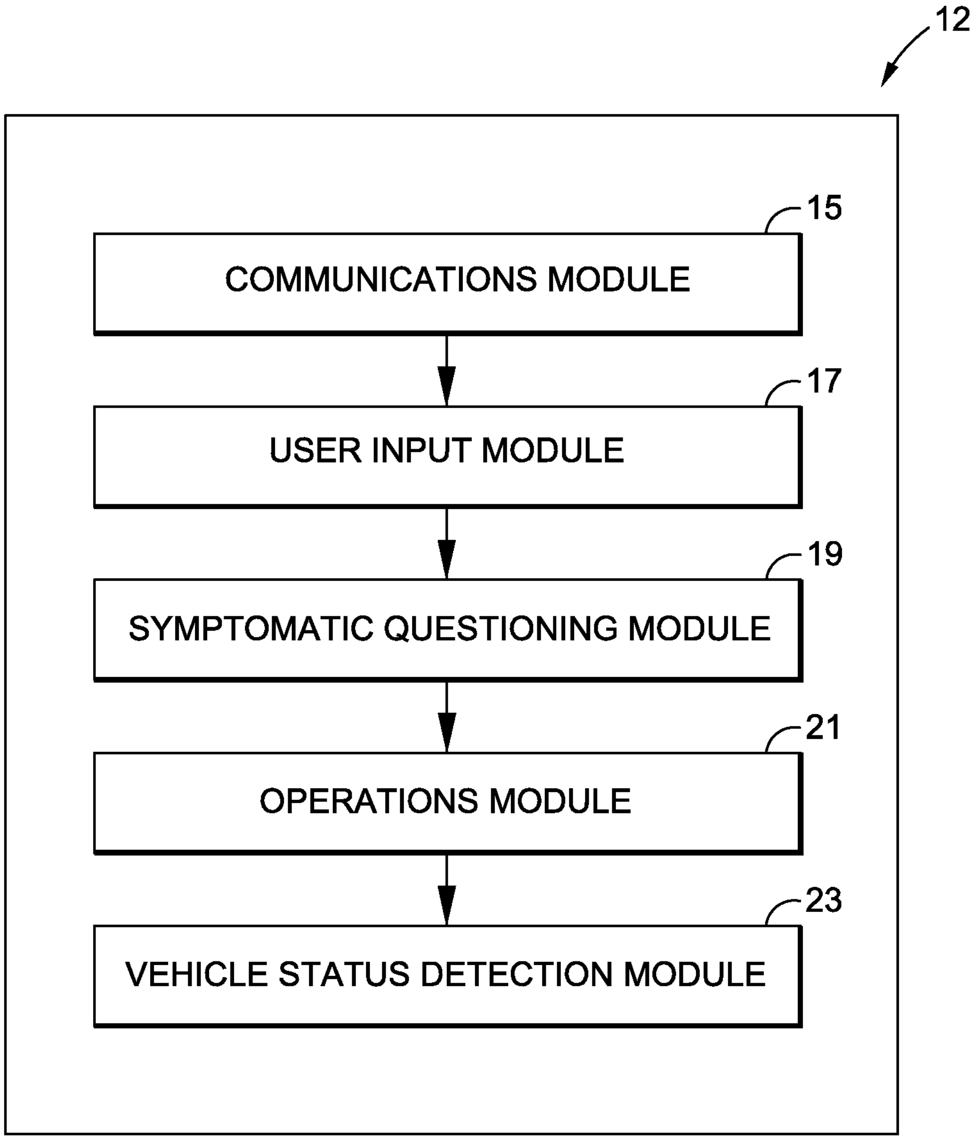
FIG. 2 is a schematic diagram of various modules which may be implemented in the smart phone.

FIG. 2 shows a schematic view of the various modules implemented into the smart phone 12 to perform the various functions described herein. The various modules shown in FIG. 2 include a communications module 15, a user input module 17, a symptomatic questioning module 19, an operations module 21, and a vehicle status detection module 23. According to one embodiment, the modules 15, 17, 19, 21, 23 are downloadable onto the smart phone 12 via the app or other computer program.

The smart phone 12 depicted in FIG. 1 includes a housing 22, a touch screen display 24, a speaker 26, and input button 28. The smart phone 12 may also include an accelerometer 25, microphone 27 and GPS 29. As used herein, a "smart phone" is a mobile phone built on a mobile computing platform, which typically includes more advance computing ability and conductivity then a standard mobile phone. Exemplary smart phones 12 include the iPhone™ by Apple™, the Droid™ by Motorola™, the Galaxy Nexus™ by Samsung™, and the Blackberry Curve™. It is also contemplated that the term "smart phone" may also include tablet computers such as the Apple iPad™, or other portable electronic devices, such as the iPod Touch™, PDAs, or other portable electric devices currently known or later developed by those skilled in the art.

According to one embodiment, the smart phone 12 interfaces with the on-board computer 14 via a data storage unit 30 which is connectable to the on-board vehicle computer 14 to retrieve and store vehicle data therefrom. As shown in FIG. 1, the data storage unit 30 is a separate device, which plugs into the standard OBD-II connector on an OBD-II compliant vehicle, although it is understood that the data storage unit 30 may connect or plug into any port on the vehicle configured for data communication with the onboard computer. The data storage unit 30 includes a housing 32 which houses a central processing unit 34 (CPU), an OBD protocol database 36, a GPS device 38, a short term memory 40, a long term memory 42, a wireless short range communication circuit 44, a wireless long range communication circuit 46, and a control module 48. The CPU 34 is configured to facilitate the processing of the functions performed by the data storage unit 30, such as data processing, signal transmission and reception, data storage, data deletion, etc. The OBD protocol database 36 is configured to poll the on-board computer 14 when the data storage unit 30 is connected the vehicle 50 to determine the particular protocol utilized by the on-board computer 14. In this regard, the OBD protocol database 36 may include several protocols which are sequenced through upon connection to the on-board computer 14. When the data storage unit 30 is attached to the OBD-II connector on the vehicle 50, the data storage unit 30 may receive power from the vehicle 50. However, it is also contemplated that the data storage unit 30 may include its own onboard battery 45 to power the data storage unit 30 in the event of power loss from the vehicle 50, as will be described in more detail below. Thus, the battery 45 enables the data storage unit 30 to operate independent of power from the vehicle 50.

During the operation of the vehicle 50, vehicle data is generated by sensors and computers located throughout the vehicle 50. This vehicle data may correspond to operational data (i.e., vehicle speeds, rpms, oxygen sensor, etc.), diagnostic trouble codes (DTC), MIL status, freeze frame data, monitor status, etc. The vehicle data may also relate to the condition of the battery, e.g., dead battery, low voltage, no start, no charge, etc. The battery condition data may be received from the on-board vehicle computer 14, or may be derived from the voltage levels received (or not received) from the vehicle 50. For instance, if the voltage level is above a first threshold, the battery may be considered to be in a good or normal condition. If the voltage level is lower than the first threshold, but above a second threshold, the battery level may be considered to be low. Furthermore, if the data storage unit 30 receives no voltage from the vehicle 50 when connected thereto, the battery may be considered to be dead or have no charge.

The data storage unit 30 connects to the on-board computer 14 via a first connector 52 located on the data storage unit 30 and a second connector 54 located on or in communication with the vehicle on-board computer 14 to receive the vehicle data from the on-board vehicle computer 14. As indicated above, the second connector 54 may be a standard OBD-II type plug-in connector. In this regard, the first and second connectors 52, 54 may physically engage to facilitate communication between the on-board computer 14 and the data storage unit 30. It is also contemplated that the data storage unit 30 may be wirelessly synched with the on-board computer 14 to allow for wireless communication therebetween. In this regard, various short ranged communication protocols, such as Bluetooth™, Infrared, RF, or other short range communication technologies may be used to facilitate such short range communication.

Figure 3:
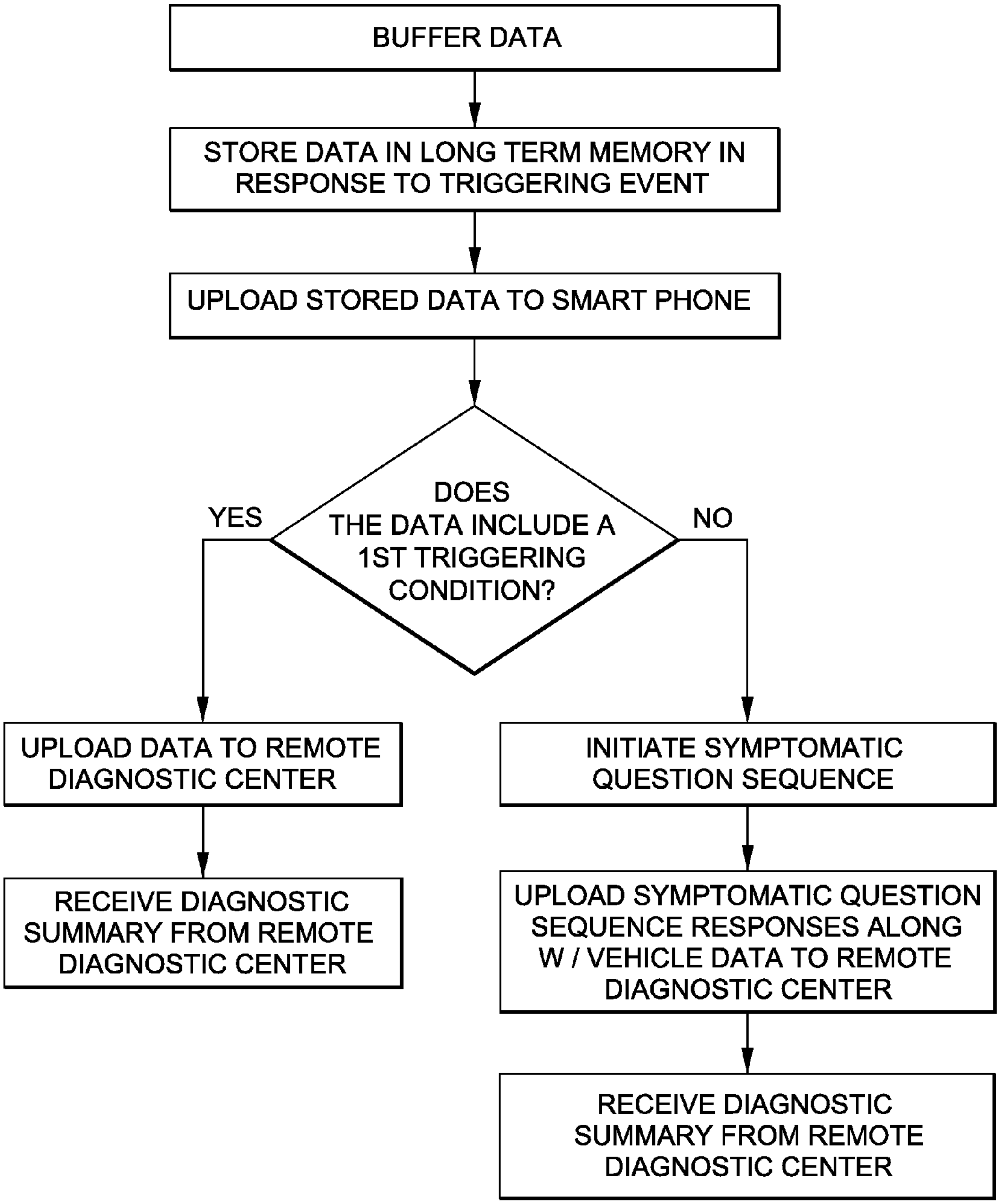
FIG. 3 is an overview of an embodiment of a diagnostic operating mode.
Figure 4:
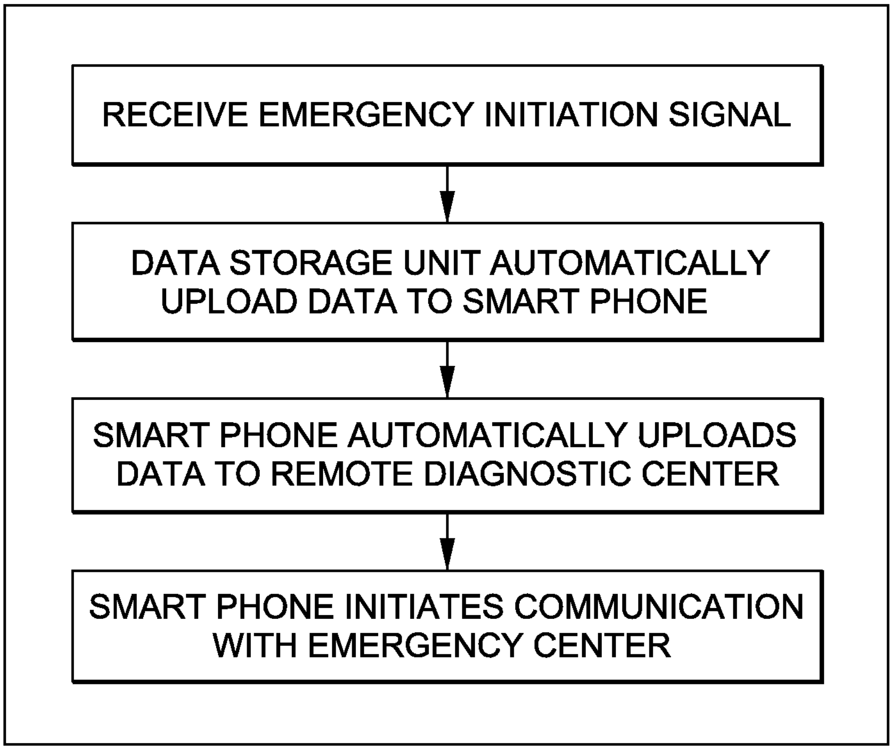
FIG. 4 is an overview of an embodiment of an emergency operating mode.

The software located on the smart phone 12 may allow the smart phone 12 to operate in several different operational modes, including a diagnostic mode (See FIG. 3) and an emergency mode (See FIG. 4). Generally speaking, when the smart phone 12 is in the diagnostic mode, the smart phone 12 automatically uploads vehicle data to the remote diagnostic center 20 when the vehicle data includes predetermined vehicle data and initiates a symptomatic question sequence for the user when the vehicle data does not include the predetermined vehicle data, such as when the vehicle data does not include at least one DTC. The diagnostic mode may also operate based on the condition of the vehicle battery. For instance, when the vehicle battery is below a prescribed operational condition, the vehicle data may be uploaded to the remote diagnostic center 20. Conversely, when the vehicle battery is healthy, and thus, is operating at or above the prescribed operational condition, the symptomatic question sequence may be triggered. The prescribed operational condition of the battery may relate to the battery amperage, battery voltage, battery load voltage, battery CCP (cold cranking power), charging voltage, or charging amperage. When the smart phone 12 is in the emergency mode, the smart phone 12 initiates communication with an emergency response center (i.e., telephone call, text message, email, etc.), and uploads vehicle data to a remote diagnostic center 20 automatically in response to receipt of an emergency initiation signal.

As set forth in more detail below, the smart phone 12 may switch between the various modes according to prompting by the user, or according to information received from the data storage unit 30, or alternatively, according to events detected by the smart phone 12. The operation of the remote diagnostic system will now be described to more specifically describe the various operational modes of the smart phone 12.

An overview of the diagnostic mode is depicted in FIG. 3. As noted above, operation of the vehicle 50 generates vehicle data. That vehicle data is stored on the onboard vehicle computer 14 and retrieved from the data storage unit 30. The data storage unit 30 may be programmed to buffer the data in the short term memory 40 and only store data in the long term memory 42 in response to a triggering event. Such a triggering event may be a routine occurrence, such as placing the vehicle in park or turning the vehicle off, or may be a more problematic occurrence, such as receiving a DTC, or an indication that the battery level is low, or some other indication of a possible problematic diagnostic condition.

The user may selectively initiate the diagnostic mode by requesting that data stored on the data stored unit 30 be uploaded to the smart phone 12. The smart phone 12 may include a first button 56 which may be pressed/selected to request the data from the data storage unit 30. As shown in FIG. 1, the smart phone 12 includes a touch screen display with a "BLUE" button representing the first button 56, such that the user may select the BLUE button to request data from the data storage unit 30.

When the user selects the first button 56, the smart phone 12 generates a data request signal which is then transmitted by the smart phone 12 and received by the data storage unit 30. The data storage unit 30 is configured to process the data request signal and generate a responsive data transfer signal including the data requested by the smart phone 12. The data included in the data transfer signal may include data from the short term memory 40, the long term memory 42, or a combination thereof, although in most circumstances, the data requested by the user will generally correspond to the data in the long term memory 42.

After the vehicle data is received by the smart phone 12, the vehicle data is processed to determine the appropriate actions to take. According to one embodiment, if the vehicle data includes at least one DTC or indicates a predetermined battery condition, the smart phone 12 may be configured to automatically transfer the vehicle data to the remote diagnostic center 20 for further analysis. The remote diagnostic center 20 may include a diagnostic database 58 which the vehicle data is matched with to determine a possible diagnostic solution. For more information related to processing of diagnostic data using a diagnostic database, please refer to U.S. Patent Application Publication No. 2010/0174446, entitled, Automotive Diagnostic Process, and U.S. Pat. No. 8,068,951, entitled Vehicle Diagnostic System, both of which are owned by Innova Electronics Corp., which also owns the present application, the contents of which are incorporated herein by reference.

If the vehicle data does not include at least one DTC or is not representative of the predetermined battery condition, the smart phone 12 may initiate a symptomatic question sequence to query the user as to the diagnostic symptoms the user is experiencing. The symptomatic question sequence may include a comprehensive, multi-level series of questions which become more specific based on the user's answers. In this regard, the smart phone app may include a database of symptomatic questions which is accessed at this point in the diagnostic process.

The symptomatic question sequence may begin with simple, closed-ended questions presented in a multiple choice format. For instance, a general question which may be initially asked to the user may be: "What appears to be the nature of the problem? A) Mechanical or B) Electrical." If the user selects "A) Mechanical," a series of follow up questions may include, "What type of symptom(s) are you experiencing? A) Irregular Smell, B) Irregular Sound, C) Irregular Sight (i.e., smoke), D) Irregular Feel (i.e., vibration)." "Where is the irregular sound coming from? A) Front-Driver's Side, B) Front-Passenger's Side, C) Rear-Driver's Side, D) Rear-Passenger's Side." "When do you hear the sound? A) When the car is in park, B) When the car is moving." "Does the sound occur when you press the brakes? A) Yes, B) No." Those skilled in the art will readily appreciate that the questions presented above are exemplary in nature only and are not intended to limit the scope of the present invention.

The answers selected by the user may be stored in the smart phone 12 and then uploaded to the remote diagnostic center 20. The answers may be matched with databases at the remote diagnostic center 20 and/or may be reviewed by diagnostic personnel, i.e., mechanics, to determine a possible diagnostic solution. For more information regarding the use of symptomatic automotive diagnostics and the triggering of the symptomatic question sequence, please refer to U.S. patent application Ser. No. 14/163,691, entitled Multi-Stage Diagnostic System and Method, owned by Innova Electronics, Inc., and the contents of which are expressly incorporated herein by reference.

After the remote diagnostic center 20 processes the data sent from the smart phone 12, whether it is actual vehicle data or symptomatic data entered by the user, the remote diagnostic center 20 sends a signal back to the smart phone 12, wherein the signal includes the possible diagnostic solution. Once received, the smart phone 12 may display the possible diagnostic solution, as well as the underlying data or a diagnostic summary. For instance, the data displayed may include the raw data, the DTC(s), DTC descriptor(s), battery voltage levels, or a diagnostic summary.

It is contemplated that the display of diagnostic information is not predicated on receipt of the possible diagnostic solution from the remote diagnostic center 20. Rather, certain diagnostic data may be displayed after receiving the vehicle data from the data storage unit 30. Along these lines, the smart phone app may be capable of performing a small amount of diagnostic processing to generate an initial diagnostic summary. For instance, the smart phone app may be capable of displaying DTC descriptors for DTCs received from the data storage unit 30.

With the diagnostic mode being described, attention is now directed to the emergency mode, with a general overview thereof being depicted in FIG. 4. The emergency mode may be initiated on the smart phone 12 upon receipt/detection of an emergency initiation signal. When the smart phone 12 is in the emergency mode, the smart phone 12 automatically uploads vehicle data to the remote diagnostic center 20 upon receiving the emergency initiation signal.

It is contemplated that the emergency initiation signal may be triggered by the vehicle 50, by the user, or detected by the smart phone 12. For instance, many vehicles are equipped with a Supplemental Restraint System (SRS) which include airbags configured to deploy in the event of an accident to cushion the impact to the passengers. When the SRS detects a significant impact, an SRS signal is generated to deploy the airbags. The SRS signal may be retrieved by the data storage unit 30 to indicate the presence of an emergency situation. In this regard, the SRS signal may cause the data storage unit 30 to generate a first emergency initiation signal and prompt the data storage unit 30 to upload vehicle data to the smart phone 12.

The emergency initiation signal may also be triggered in connection with the battery condition. For instance if the battery is dead, or is incapable of starting the vehicle, or has no charge, the emergency initiation signal may be triggered. In this case, the emergency initiation signal may be triggered by the data storage unit 30, since the vehicle 50 may be unresponsive or incapable of generating a signal itself. As such, the battery 45 on the data storage unit 30 may provide the power necessary to operate under such conditions.

Receipt of the first emergency initiation signal will cause the smart phone 12 to operate in the emergency mode. When the smart phone 12 is in the emergency mode, the smart phone 12 communicates critical data to the remote diagnostic center 20 to preserve the data and to facilitate emergency response. In this regard, the smart phone 12 may not only communicate vehicle data to the remote diagnostic center 20, the smart phone 12 may also communicate GPS data or other data stored on the phone 12 or accessible by the phone 12.

The smart phone 12 may also be configured to initiate a phone call with the emergency response center 18 when the phone 12 enters the emergency mode. In other words, the smart phone 12 may place a phone call to the emergency response center 18 when the first emergency initiation signal is received by the smart phone 12.

The initiation of the phone call alerts the emergency response center 18 that the user has been in an accident and also allows the emergency response center 18 to hear what is happening. Therefore, if as a consequence of the accident, the driver is lodged in the vehicle 50 and cannot move, the driver merely has to speak to communicate with the personnel at the emergency response center 18. No affirmative actions need to be taken by the driver to make the call when the phone 12 is operating in the emergency mode. Therefore, the emergency mode provides a level of assurance that critical information will be communicated to emergency response personnel and that the appropriate resources will be dispatched in the event of an accident. For instance, the emergency response center 18 may dispatch roadside service, towing, medical response teams, etc.

Although the foregoing describes the emergency mode being initiated in response to data received from the vehicle 50, it is also contemplated that the emergency mode may be initiated in response to user input into the smart phone 12. For instance, the smart phone 12 may include an emergency mode button 60 which the user may press/actuate to place the phone 12 in the emergency mode. When the user presses the emergency mode button 60, a signal is sent to the data storage unit 30 to upload data to the smart phone 12. When the smart phone 12 receives the data, the smart phone 12 automatically uploads the data to the remote diagnostic center 20, as explained above. In addition, the smart phone 12 also initiates a telephone call with the emergency response center 18, as described above.

The user actuated initiation of the emergency mode may be useful when the user is experiencing an emergency that is not related to the vehicle 50. For instance, if the driver or one of the passengers is experiencing an emergency medical condition, the emergency mode may be used to communicate critical data (i.e., GPS data) to a remote location, as well as initiate an emergency phone call in a single action (i.e., pressing the emergency mode button 60).

The emergency mode button 60 may also be used as a "panic" button to actuate the alarm system on the vehicle 50. More specifically, if the user presses and holds the emergency mode button 60, a panic signal may be sent from the smart phone 12 to the data storage unit 30, and then to the vehicle 50. The data storage unit 30 may be able to translate the panic signal sent from the smart phone 12 into a language or protocol understood by the vehicle 50, such that when the vehicle 50 receives the modulated panic signal from the data storage unit 30, the alarm is actuated.

It is important to distinguish the difference between merely pressing the emergency mode button 60 and pressing and holding the emergency mode button 60. When the button 60 is simply pressed, i.e., the user quickly releases his finger shortly after pressing the button 60, the emergency mode is started without triggering the panic signal. However, when the button 60 is pressed and held, i.e., the user continues to apply pressure on the button 60 for a longer period of time when the button 60 is pressed or actuated, which generates the panic signal. For instance, the phone 12 may be configured such that the user must press and hold the button 60 for more than one second to initiate the panic signal.

In yet another embodiment, the emergency mode may be actuated in response to an event detected by the smart phone 12 using resources local to the smart phone 12, such as the microphone, accelerometer, GPS, etc. For instance, an accident or similar automotive emergency situation is typically associated with elevated sounds, such as screeching tires, smashing glass, vehicle impact, loud screams, etc., which may be detected by the microphone. Such an event may also be associated with high accelerations, such as the vehicle coming to an abrupt stop, making an abrupt turn, or experiencing irregular vibrations, which may be detected by the accelerometer. The GPS may be used to detect deviations from a defined route, which may include a vehicle driving off a road, or the vehicle being driven outside of a preset navigation plan, which may be set by a parent, employer, etc.

In a preferred embodiment, the smart phone 12 uses information collected from a plurality of local resources, such as the accelerometer 25, microphone 27, and/or GPS 29 to make a determination as to the operational status of the vehicle. However, it is also contemplated that in other embodiments, the accelerometer 25, microphone 27, GPS 29, etc., may be used independent of one another during an analytics period.

For more information regarding the use of the smart phone 12 or other handheld communication devices for detecting an accident or other operational events associated with a vehicle, please refer to U.S. patent application Ser. No. 14/509,874, filed Oct. 8, 2014, entitled System for Detecting the Operational Status of a Vehicle Using a Handheld Communication Device, owned by Innova Electronics, the Applicant of the present application, and the contents of which are expressly incorporated herein by reference.

When the smart phone 12 detects a prescribed event associated with operation of the vehicle, e.g., an accident, the smart phone 12 may generate an emergency signal which transitions the smart phone 12 to operate in the emergency mode. When operating in the emergency mode, the smart phone 12 may automatically retrieve data and information from the vehicle, either through the dongle or directly from the vehicle, and upload the retrieved data and information to a remote location, such as a remote diagnostic database, emergency response center (e.g., 911), or initiate a call or message to a relative or other defined contact. The uploaded data and information may also include position information retrieved from the smart phone GPS and/or the dongle GPS.

The ability of the smart phone 12 to independently detect an automotive event serves as a safeguard in the event the vehicle is unable to transmit an emergency signal. For instance, if the car battery dies, the OBD-II port is rendered inoperable as the result of a crash or impact, or if the vehicle is not equipped with the ability to transmit operational data and information, the detection and communication abilities of the smart phone 12 may provide a baseline level of vehicle monitoring to seek assistance for the driver in the event of an accident. This baseline level of vehicle monitoring may calm the concerns of a parent, employer or owner of a vehicle, knowing that if an accident occurs, the system will alert someone to respond to the accident.

Although the foregoing describes the diagnostic system as including a separate, plug-connectable data storage unit 30, it is expressly contemplated that other embodiments of the invention may include a data storage unit integrated into the vehicle 50. For instance, the on-board computer 14 may be configured to perform all of the functionality of the data storage unit 30 described above, including data buffering and storage, GPS location identification, short range communication, long range communication, data processing, etc. In this regard, the smart phone 12 may communicate directly with the on-board computer 14 via short range communication means, such as Bluetooth™, infra-red communication or other wireless communication means. It is also contemplated that the smart phone 12 may communication via direct, hard wired communication.

The foregoing expressly contemplates utilizing the smart phone 12 as a communication hub between the vehicle 50, a remote diagnostic database 20, an emergency response center 18, and other remote locations/resources. It is additionally contemplated that in other embodiments of the present invention, the smart phone 12 may be utilized to control one or more systems on the vehicle 50. For instance, the smart phone 12 may be capable of sending a signal to the vehicle 50, specifically the on-board computer/ECU 14 to remotely start the engine, lock/unlock the door(s), open the trunk, etc.

Figure 5:
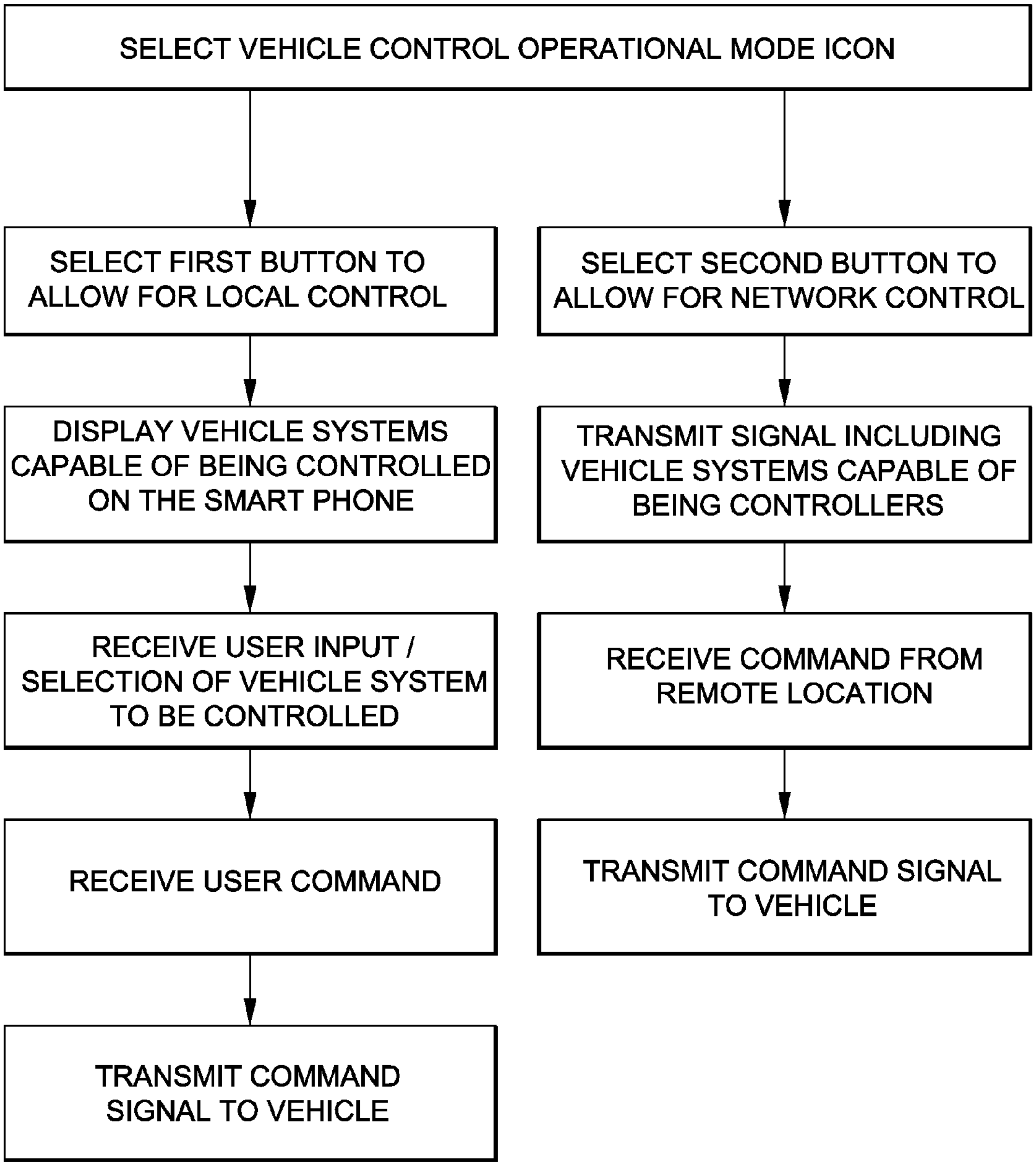
FIG. 5 is an overview of an embodiment of a vehicle control operational mode.

The smart phone 12 may include one or more dedicated buttons for enabling local control (i.e., control by the operator of the smart phone 12) of the vehicle 50, or remote control (i.e., control from a remote location, such as a customer service center) of the vehicle 50. The buttons 56, 60 shown in FIG. 1 may be used in a vehicle control operational mode, as opposed to a diagnostic operational mode discussed above, to enable control over vehicle systems. FIG. 5 provides an overview of an embodiment of the vehicle control operating mode. Each mode may include a dedicated icon which may be displayed on the smart phone display 24. The user may selectively switch between the vehicle control operational mode and the diagnostic operational mode by selecting the associated icon or button on the smart phone 12.

The first button (blue button) 56 may be used to allow a user to control one or more vehicle systems. The smart phone 12 may display on the display screen 24 one or more vehicle systems capable of being controlled by the smart phone 12. The user may select the specific one of the vehicle systems which the user wants to control and then press the first button to effectuate the desired functionality. For instance, the smart phone 12 may provide a list of options including: START ENGINE, UNLOCK DOOR, LOCK DOOR, OPEN TRUNK, CLOSE TRUNK, TEMPERATURE CONTROL, and RADIO CONTROL. The user may select one of the options and then press the first button 56, which in turn generates a command signal that is transmitted to the vehicle. It is contemplated that the command signal may be communicated directly to the on-board computer 14, or alternatively transmitted to the data storage unit 30, which then sends to the command signal to the on-board computer 14. In some cases, the user may have to make more than one selection on the display screen 24, depending on the selected option. For instance, if the user selects TEMPERATURE CONTROL, the display screen 24 may then list several temperatures which the user then selects. After the final temperature is selected, the user then presses the first button 56 to send the command to the vehicle 50. Thus, it is contemplated that several selections may be made before the command is sent to the vehicle 50, or alternatively, a single selection may be made before the command is sent to the vehicle 50.

The second button 60 may be actuated by the user to enable control of the vehicle 50 from a remote location. When the second button 60 is actuated, the smart phone 12 establishes communication with a customer service center 16, such as through a telephone call, email, text message, etc. The personnel at the customer service center 16 obtains information from the user and determines the appropriate action to take. For instance, if the vehicle 50 is in an accident, the user may actuate the second button 60 to contact the customer service center 16 to request that the vehicle be turned off. The customer service center 16 may then transmit a command signal to the smart phone 12, which is then communicated to the vehicle 50.

As described above, various aspects of the present invention provide diagnostic functionality, as well as vehicle monitoring functionality. As such, the system is a comprehensive, all-in-one safety system, which provides several level of vehicle monitoring, which can enhance the protection for almost any driver. The combination of the data storage unit and the smart phone application creates a powerful automotive safety tool, which can appeal to those wanting both diagnostic information, as well as vehicle monitoring information. Along these lines, the vehicle monitoring features associated with the system may be particularly desirable for parents of young drivers or college-bound students to keep the parents reassured of the safety of their kids. The diagnostic features associated with the system may be particularly desirable for fleet management, to facilitate routine maintenance and repair of the fleet.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. An automotive diagnostic system for use with a remote diagnostic center, a smart phone having a sensor for detecting a prescribed vehicle operational condition, and a vehicle having an onboard vehicle computer which generates and stores vehicle data including operational data and an accident indicator generated in response to a vehicle accident event, the automotive diagnostic system comprising:

- a data storage unit connectable with the onboard vehicle computer for retrieving vehicle data from the onboard vehicle computer and storing the vehicle data, the data storage unit being configured to generate a first emergency initiation signal in response to receipt of the accident indicator from the vehicle; and
- non-transitory computer executable instructions stored in the smart phone for configuring the smart phone to:
  - communicate with the data storage unit;
  - receive a second emergency initiation signal from the user;
  - generate a third emergency initiation signal in response to detection of the prescribed vehicle operational condition by the smart phone; and
  - operate in a diagnostic mode and an emergency mode;
  - in the diagnostic mode, the smart phone uploads vehicle data to the remote diagnostic center when the vehicle data includes predetermined operational data, and initiates a symptomatic question sequence for the user when the vehicle data does not include the predetermined operational data and there is no accident indicator received from the vehicle wherein the symptomatic question sequence for the user in the diagnostic mode comprises a plurality of closed-ended questions presented in a multiple choice format, and wherein the multiple choice answers further include follow up questions:
    1. what appears to be the nature of the problem?
       - a) mechanical; or
       - b) electrical
    2. what type of symptom(s) are you experiencing?
       - a) irregular smell;
       - b) irregular sound;
       - c) irregular sight, smoke; or
       - d) irregular feel, vibration
    3. where is the irregular sound coming from?
       - a) front-driver's side;
       - b) front-passenger's side;
       - c) rear-driver's side or
       - d) rear-passenger's side
    4. When do you hear the sound?
       - a) when the car is parked; or
       - b) when the car is moving and
    5. Does the sound occur when you press the brake?
       - a) yes; or
       - b) no; and
  - in the emergency mode, the smart phone uploads vehicle data to the remote diagnostic center automatically in response to receipt of one of the first, second, and third emergency initiation signals.

2. The automotive diagnostic system recited in claim 1, wherein the operational data includes a diagnostic trouble code, and the data storage unit is configured to retrieve the diagnostic trouble code from the onboard vehicle computer.

3. The automotive diagnostic system recited in claim 1, wherein the operational data includes battery condition information, and the data storage unit is configured to retrieve the battery condition information from the onboard vehicle computer.

4. The automotive diagnostic system recited in claim 3, wherein the data storage unit includes an internal power supply separate from a vehicle power supply.

5. The automotive diagnostic system recited in claim 4, wherein the data storage unit is configured to:

- receive a voltage signal from the vehicle when the data storage unit is connected to the vehicle; and
- generate a voltage loss signal when the data storage unit is connected to the vehicle and the voltage signal is below a prescribed threshold.

6. The automotive diagnostic system recited in claim 1, wherein the accident indicator is associated with airbag deployment.

7. The automotive diagnostic system recited in claim 1, wherein the computer executable instructions configure the smart phone to detect the prescribed vehicle operational condition based on a change in acceleration sensed by the smart phone.

8. The automotive diagnostic system recited in claim 1, wherein the computer executable instructions configures the smart phone to detect the prescribed vehicle operational condition based on an acoustic signal sensed by the smart phone.

9. The automotive diagnostic system recited in claim 1, wherein the computer executable instructions configures the smart phone to detect the prescribed vehicle operational condition based on combination of an acoustic signal and a change in acceleration sensed by the smart phone.

10. The automotive diagnostic system recited in claim 1, wherein the data storage unit is adapted to transmit a wireless signal.

11. The automotive diagnostic system recited in claim 10, wherein the data storage unit is adapted to transmit the wireless signal using a short-range wireless protocol having a range of less than or equal to 50 feet.

12. The automotive diagnostic system recited in claim 10, wherein the data storage unit is adapted to transmit the wireless signal using a long-range wireless protocol having a range of greater than 50 feet.

13. The automotive diagnostic system recited in claim 1, wherein the computer executable instructions further configure the smart phone to assign a diagnostic mode button and an emergency mode button, such that when the diagnostic mode button is activated by the user, the smart phone enters the diagnostic mode, and when the emergency mode button is activated by the user, the second initiation signal is generated.

14. The automotive diagnostic system recited in claim 1, wherein the initiation of the symptomatic question sequence in the diagnostic mode is initiated independent of any user intervention.

15. An automotive diagnostic and safety method using a handheld communication device adapted to interface with a remote diagnostic center and a vehicle, the handheld communication device having a sensor for detecting a prescribed vehicle operational condition, and the vehicle having an onboard vehicle computer which generates and stores vehicle data including operational data and an accident indicator generated in response to a vehicle accident event, the method comprising:

establishing a communication link between the handheld communication device and the onboard vehicle computer;

receiving vehicle data from the onboard vehicle computer at the handheld communication device;

configuring the handheld communication device to:

generate a first emergency initiation signal on the handheld communication device in response to receipt of the accident indicator from the vehicle on the handheld communication device;

generate a second emergency initiation signal on the handheld communication device in response to receipt of an emergency input from the user on the handheld communication device;

generate a third emergency initiation signal on the handheld communication device in response to detection of the prescribed vehicle operational condition by the handheld communication device; and operating the handheld communication device in a diagnostic mode and an emergency mode;

in the diagnostic mode, the handheld communication device uploads vehicle data to the remote diagnostic center when the vehicle data includes predetermined operational data, and initiates a symptomatic question sequence for the user displayed on the handheld communication device when the vehicle data does not include the predetermined operational data; wherein the symptomatic question sequence for the user in the diagnostic mode comprises a plurality of closed-ended questions presented in a multiple choice format, and wherein the multiple choice answers further include follow up questions:

1. what appears to be the nature of the problem?
   a) mechanical; or
   b) electrical
2. what type of symptom(s) are you experiencing?
   a) irregular smell;
   b) irregular sound;
   c) irregular sight, smoke; or
   d) irregular feel, vibration
3. where is the irregular sound coming from?
   a) front-driver's side;
   b) front-passenger's side;
   c) rear-driver's side or
   d) rear-passenger's side
4. When do you hear the sound?
   a) when the car is parked; or
   b) when the car is moving and
5. Does the sound occur when you press the brake?
   a) yes; or
   b) no; and in the emergency mode, the handheld communication device uploads vehicle data to the remote diagnostic center automatically in response to receipt of one of the first, second, and third emergency initiation signals.

16. The method recited in claim 15, wherein the step of retrieving vehicle data from the onboard vehicle computer onto the handheld communication device is achieved through direct communication between the handheld communication device and the vehicle.

17. The method recited in claim 16, wherein the direct communication between the handheld communication device and the vehicle is wireless communication.

18. The method recited in claim 15, wherein the step of retrieving vehicle data includes retrieving a diagnostic trouble code from the onboard vehicle computer.

19. The method recited in claim 15, wherein the step of retrieving vehicle data includes retrieving battery condition information.

20. The method recited in claim 15, wherein the accident indicator is associated with airbag deployment.

21. The method recited in claim 15, wherein the detection of the prescribed vehicle operational condition is based on a change in acceleration sensed by the handheld communication device.

22. The method recited in claim 15, wherein the detection of the prescribed vehicle operational condition is based on an acoustic signal sensed by the handheld communication device.

23. The method recited in claim 15, wherein the detection of the prescribed vehicle operational condition is based on combination of an acoustic signal and a change in acceleration sensed by the handheld communication device.

* * * * *